United States Patent [19]

Skarvada

[11] 4,135,403
[45] Jan. 23, 1979

[54] ELECTRONIC ALTITUDE ENCODER

[75] Inventor: Thomas Skarvada, Woodland Hills, Calif.

[73] Assignee: Automation Industries, Inc., Los Angeles, Calif.

[21] Appl. No.: 800,443

[22] Filed: May 25, 1977

[51] Int. Cl.² .................. G01L 7/00; G01C 21/00
[52] U.S. Cl. ................................ 73/384; 364/433
[58] Field of Search .................. 73/384, 386, 387; 364/433

[56] References Cited

U.S. PATENT DOCUMENTS

| 3,729,999 | 5/1973 | Shimomura | 73/384 |
| 3,958,108 | 5/1976 | Shimonura | 73/384 |
| 3,958,459 | 5/1976 | Shimomura | 73/384 |

Primary Examiner—Donald O. Woodiel
Attorney, Agent, or Firm—Anthony W. Karambelas

[57] ABSTRACT

An encoder is disclosed for providing an accurate digital representation of the altitude of an aircraft vehicle by comparing an output signal from a pressure transducer which is a function of the barometric pressure at the altitude of the vehicle with an internally generated waveform which represents a curve of altitude vs. barometric pressure on its X—Y axis. The waveform is generated by a closed loop having an integrator circuit for providing the waveform, a comparator, a filter, a voltage controlled oscillator, and a counter, which all maintain the amplitude of the waveform within precise limits. The output signal from the transducer and the wave form from the closed loop are compared by a second comparator to provide a signal which transfers temporary information in the counter to a storage device which provides a coded digital output of the altitude of the vehicle.

15 Claims, 3 Drawing Figures

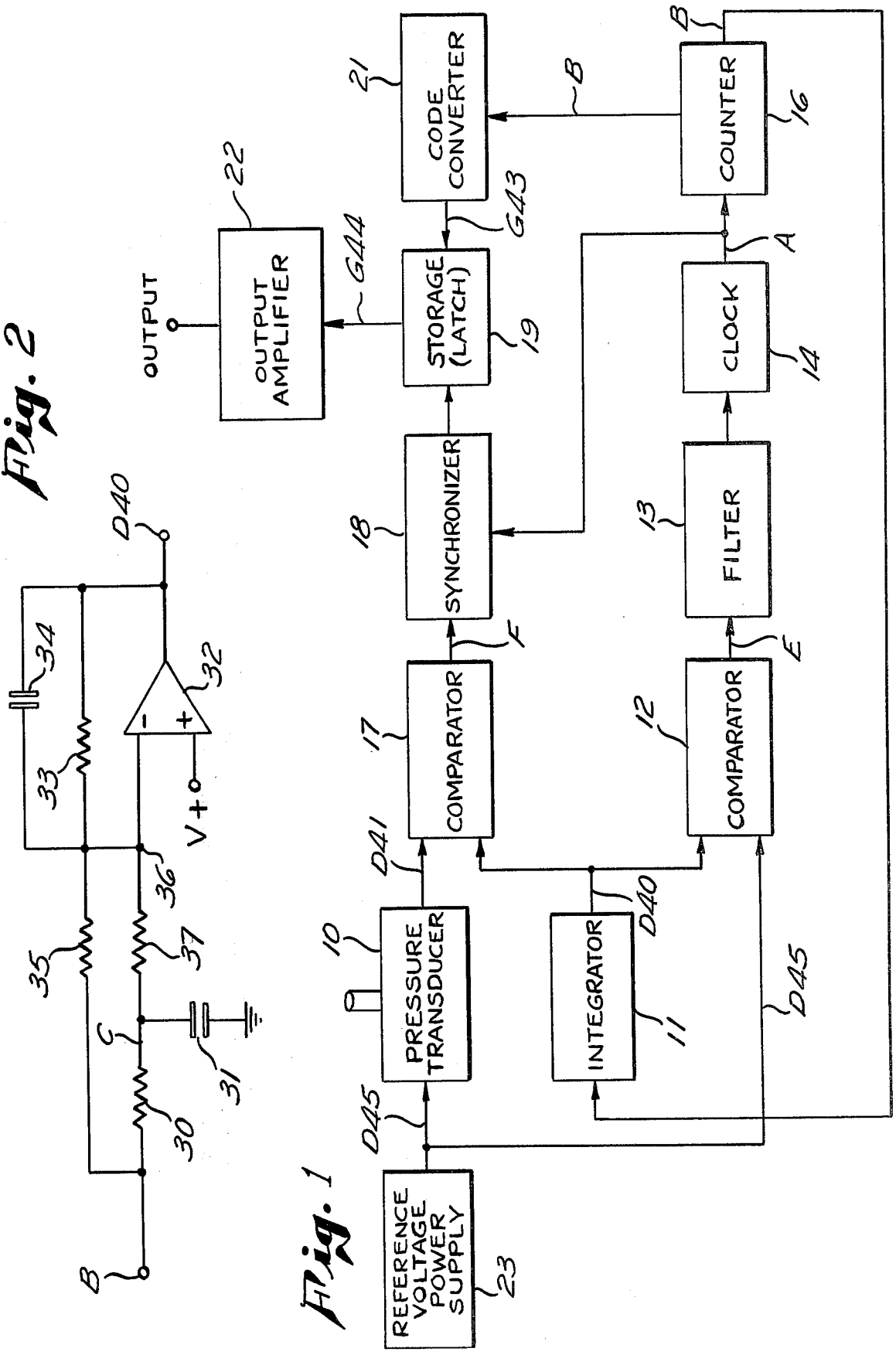

ELECTRONIC ALTITUDE ENCODER

BACKGROUND

The present invention relates to a digital encoder and more particularly to a device for providing digitally encoded information of the altitude of an aircraft vehicle.

Various prior art devices have sought to measure the altitude of an aircraft using encoding techniques. One type of device is an optical encoder which uses a disc having a number of successive transparent and opaque portions representing bits of digital codewords. The discs are mounted on a shaft and rotated mechanically. Since these devices are mechanical, they are expensive and do not provide high resolution of altitude.

Electronic devices have sought to measure altitude by providing a curve which approximates altitude vs. barometric pressure. Barometric pressure is related to altitude on a nonlinear scale which is approximately exponential. Such electronic devices have sought to provide the pressure vs. altitude curve by successive approximations of the non-linear curve using small discrete linear portions. This technique requires a large number of approximations which increases the number of circuits, and hence, the complexity of the device. In order to use this technique with any degree of accuracy, it is also necessary to use components which are exceedingly stable with time and temperature. Thus, this technique is costly if employed to provide very accurate altitude measurement.

In another approach, altitude has been measured by using a pressure transducer to measure the barometric pressure in the environment surrounding the aircraft vehicle and convert it to a digital word which is fed to a read only memory (ROM). The ROM operates in a "table lookup" fashion to provide an output in response to input information. This technique is subject to errors in altitude measurements over a large range of altitudes because of non-linear altitude vs. pressure relationship.

SUMMARY

The present invention provides an encoder for providing digital information of the altitude of an aircraft vehicle by comparing the output signal from a pressure transducer with a waveform generated by an integrator circuit.

The transducer measures the barometric pressure in the immediate environment of the vehicle and since barometric pressure is a function of altitude, the signal from the transducer is electronically processed to provide an indication of altitude. Since pressure is related to altitude on a nonlinear scale which is approximately exponential, it is necessary to provide a nonlinear voltage waveform which is an accurate representation of barometric pressure vs. altitude. This waveform is generated by the integrator circuit having an RC feedback loop. The integrator circuit further includes an RC input circuit for providing further integration to compensate for the small differences between the true exponential curve and the actual altitude vs. pressure curve.

The integrator is connected in a closed loop which includes a comparator, a filter network, a clock and a counter. The clock is a voltage controlled oscillator which provides clock pulses to a counter which in turn generates an output waveform having a frequency which is the quotient of the frequency of the clock divided by the number of states of the counter. The output of the counter is coupled to the input of the integrator to provide a recurring exponential curve at a frequency equal to the frequency of the output of the counter.

Since this curve is a reference with which the output of the pressure tranducer is compared, it is necessary to maintain the amplitude of the reference signals from the integrator within precise voltage limits. This is achieved by self-adjusting the frequency of the clock so that the positive and negative peaks of the waveform produced by the integrator are at predetermined voltage levels. This is achieved by comparing the output of the integrator with a reference voltage in the comparator circuit which provides a short duration refresh pulse having a width determined by the relative magnitudes of the reference voltage as compared to the amplitude of the output of the integrator. This pulse has a frequency equal to the frequency of the output waveform of the integrator. The refresh pulse is applied to the filter circuit which converts it into a DC level to control the frequency of the clock.

If the amplitude of the output signal from the integrator exceeds the reference voltage, the operation of the closed loop increases the frequency of the clock to thereby reduce the peak amplitude of the output signal from the integrator until it reaches the reference voltage level. Correspondingly, if the peak amplitude of the output signal of the integrator is too low, the closed loop decreases the frequency of the clock to thereby increase the amplitude of the output waveform from the integrator to the reference voltage level. Only one comparator is required in the closed loop because of symmetry of the output waveform of the integrator since it is driven by a precise square wave from the counter.

The output signal from the pressure transducer and the waveform produced by the integrator are both applied to a second comparator which generates a signal which has a change of state (in the preferred embodiment a positive transition) when the waveform intersects the output of the transducer. This transition of the output of the second comparator is sychronized with the clock and addresses a storage device which stores a temporary digitally encoded word from the counter. The output of the storage device provides digital information of the altitude.

Accordingly, a feature of the present invention is to encode a signal representative of the altitude of an aircraft vehicle by comparing the output of a pressure transducer with the waveform of an integrator which represents a curve of barometric pressure vs. altitude.

Another feature is to provide closed loop circuit means for accurately controlling the amplitude of the waveform of the integrator.

Still another feature is to provide integrator means for generating a waveform which accurately represents a curve of barometric pressure vs. altitude.

Other features, advantages and novel features of the present invention will become apparent from the following detailed description of the invention.

DRAWING

FIG. 1 is a block diagram of the electronic altitude encoder of the present invention.

FIG. 2 is a circuit diagram of the integrator.

DESCRIPTION

Figure 3:
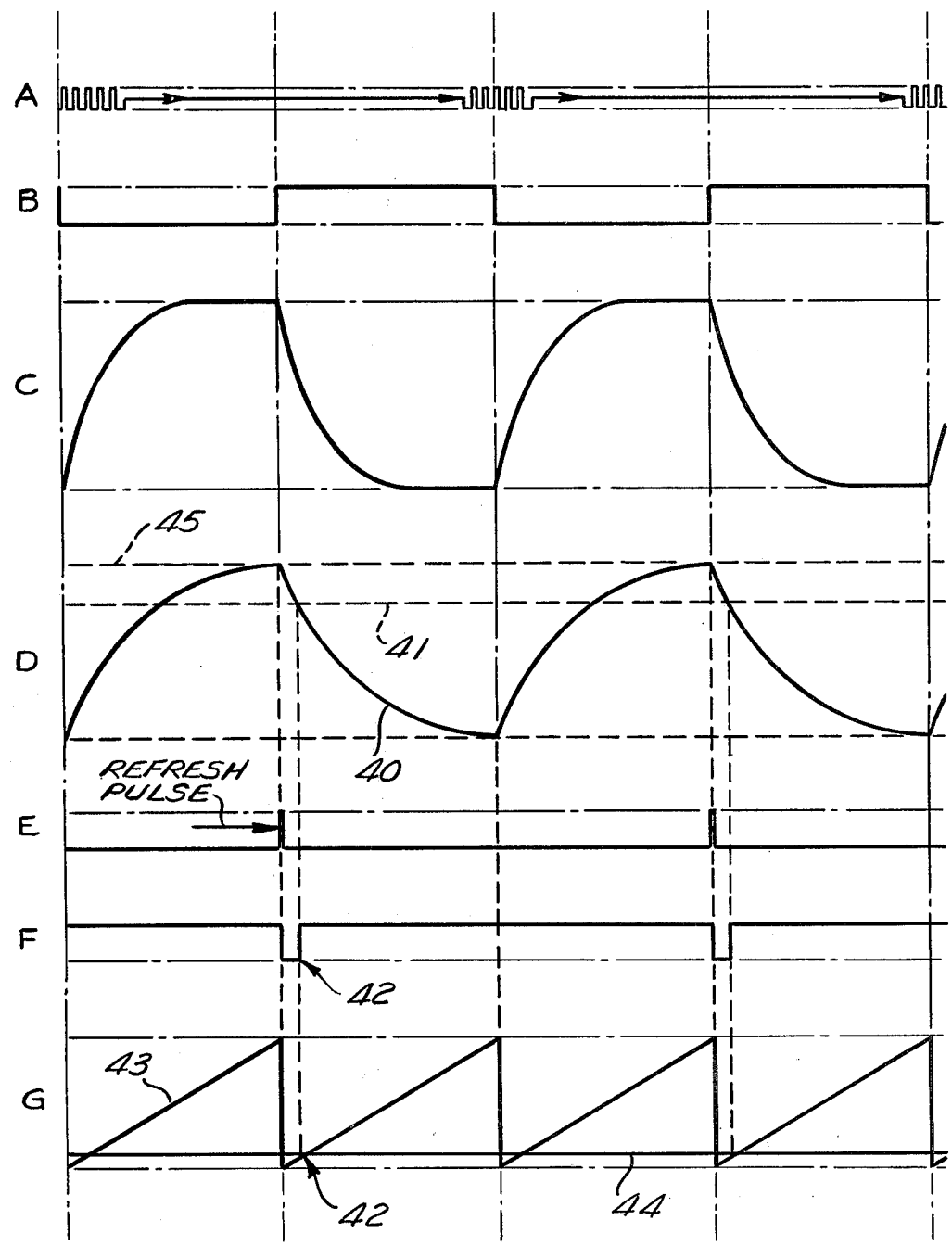
FIG. 3a through 3g are timing diagrams of the present invention.

Referring now to FIG. 1 there is shown the altitude encoder of the present invention having pressure transducer means shown as pressure transducer 10 for providing an output signal which is a function of the barometric pressure at the altitude sought to be measured. Integrator means shown as an integrator 11 provides a waveform which represents a curve of altitude as a function of barometric pressure.

The present invention provides means coupled in a closed loop to the integrator 11 for maintaining the amplitude of the waveform from the integrator within precise limits. In the preferred embodiment this includes comparator 12, filter 13, clock 14 and counter 16 all coupled in a closed loop with integrator 11 as shown.

The pressure transducer 10 and the integrator 11 are coupled to means for combining their outputs for providing a representation of the altitude sought to be measured. In the preferred embodiment, this includes comparator means shown as comparator 17 having one input coupled to the output of the pressure transducer 10 and a second input coupled to the integrator means. The comparator 17 produces a transition of its output state when the output signal provided by the pressure transducer 10 intersects the waveform provided by the integrator 11.

The output of comparator 17 is coupled to a synchronizer 18 having a second input coupled to the output of clock 14 for synchronizing the operation of comparator 17 with the operation of the closed loop.

The synchronizer 18 is coupled to storage means shown as storage 19 for providing a digitally encoded representation of the altitude sought to be measured. Code converter means is provided in the form of code converter 21 which is coupled to the output of the counter 16 for providing an encoded count of the number of pulses produced by the counter 16. The storage 19 includes a plurality of flip-flops at the output of code converter 21 and temporarily stores an output of the code converter 21 at the point of the time when the comparator 17 provides a transition of its output state.

The encoded representation of the output stored in the latches of storage 19 is transmitted to an output amplifier 22 which buffers the digitally encoded word and interfaces it to suitable external equipment.

The comparator 12, in addition to having a first input from the output of integrator 11, has a second input from a reference voltage power supply 23. The comparator compares the output of the integrator 11 with the reference voltage to produce a refresh pulse shown in FIG. 3e for adjusting the amplitude of the waveform from the integrator 11 to maintain it within precise limits.

The filter 13 is responsive to the refresh pulse from the comparator 12 for providing a DC voltage which is applied to the clock 14. The clock 14 is a voltage controlled oscillator which provides a series of recurring pulses at a frequency which may be adjusted by the input DC level from filter 13. The output of the clock 14 is coupled to the counter 16 for providing a series of pulses used to control the integrator 11 having a frequency proportional to the frequency of the clock 14. The frequency of the counter 16 is operative to control the peak to peak amplitude of the output waveform of the integrator 11 to maintain it within precise limits.

If the amplitude of the output waveform of integrator 11 exceeds the reference voltage applied from reference voltage power supply 23, the ouput of comparator 12 provides a refresh pulse which is converted to a DC level by filter 13 and is applied to the voltage controlled oscillator (clock) 14 to increase its frequency. The increase in frequency of clock 14 correspondingly increases the frequency of counter 16 which in turn increases the frequency of the integrator 11 to thereby reduce the peak amplitude of the output waveform from integrator 11. Correspondingly, if the amplitude of the output waveform of integrator 11 is below the reference voltage level applied from reference voltage supply 23, the comparator 12 does not provide any refresh pulse to the filter 13 to thereby enable the voltage controlled oscillator (clock) 14 to decrease in frequency. This causes a proportional decrease in frequency of counter 16 which, in turn, decreases the frequency of the integrator 11 to thereby raise the peak to peak amplitude of the output waveform of the integrator 11. Thus, the operation of the closed loop maintains the output waveform of the integrator 11 within precice limits determined by the reference voltage from the reference voltage power supply 23.

The counter 16 also provides a series of regularly recurring pulses to the code converter 21 which contains logic circuits to convert the input pulses to a digital output code which may be any suitable standard code such as ARINC code which is used in accordance with FAA regulations for measuring altitude of aircraft vehicles. The ARINC code increases linearly in discrete steps each of which represents a 100 feet of altitude. The output of the code converter 21 is applied to the storage 19 which includes a plurality of flip-flops for storing the digitally encoded information of the altitude when sampled by the synchronizer 18. The synchronizer 18 provides standard delay means to delay the transition of the output pulse of comparator 17 to provide the transition when the output of the clock 14 is changing from low state to the high state to thereby synchronize the operation of the comparator 17 with that of clock 14.

The storage 19 is operative to temporarily store the digitally encoded representation of the altitude in its flip-flops until the comparator 17 compares the output waveform of integrator 11 with the output signal of the pressure transducer 10 during the next cycle of operation of the integrator 11. The encoded representation of the altitude in the flip-flops of storage 19 may be read out by the output amplifier 22 which buffers the digitally encoded word in the storage 19 to interface it to any suitable externally connected equipment.

The reference voltage power supply 23, in addition to being coupled to comparator 12 for providing a reference voltage, is also coupled to the pressure transducer 10 for providing a reference voltage. The use of the same reference voltage power supply for both the pressure transducer 10 and the comparator 12 increases the accuracy of the operation of the system since any drift of the reference voltage simultaneously changes the magnitude of the output signal of the pressure transducer in an amount corresponding to the change in the amplitude of the waveform provided by the integrator 11 to thereby maintain the integrity of the comparison of the two signals.

As shown in the detailed circuit in FIG. 2, the integrator includes a passive integrator network having a first resistor-capacitor circuit formed of (register) 30 and capacitor 31 with capacitor 31 connected to ground. The resistor 30 and capacitor 31 provides an exponential waveform.

The integrator further includes an active integrator network having an operational amplifier 32 with a second resistor-capacitor network formed of resistor 33, resistor 35 and capacitor 34. The combination of the first exponential waveform from the passive integrator network and the second exponential waveform from the active integrator network forms a composite waveform which closely approximates a curve of altitude as a function of barometric pressure.

The exponential waveform provided by the combination of the resistor 30 and the capacitor 31 is applied through a resistor 37 to the summing terminal 36. Because of the time constant provided by the resistor 30 and capacitor 31, there is a delay in the current applied through resistor 37, there is a delay in the current applied throught resistor 37 to the summing terminal 36 which is connected to the negative input terminal of the operational amplifier 32. However, there is no delay in the application of the current applied through resistor 35 to the summing terminal 36 and the negative input terminal of operational amplifier 32. Therefore, there is a slight delay in reaching the steady state current applied to the summing point 36.

The resistors 33, 35 and the capacitor 34 coupled in the feedback path of the operational amplifier 32 would provide an exponential output waveform at the output of the integrator. The presence of the passive integrating network formed of resistor 30 and capacitor 31 alters this exponential output waveform of the integrating network to provide a waveform which very closely approximates the curve of altitude as a function of barometric pressure as shown in FIGS. 3c and 3d.

The integrator shown in FIG. 2 is formed of standard components. The operational amplifier may be any suitable operational amplifier such as model m A741 HM manufactured by Fairchild Semiconductor. The resistors and capacitors may be adjusted to provide a suitable curve of barometric pressure versus altitude and a set of exemplary nominal values (subject to calibration) are as follows:

Resistor 30—26.1 kilohms
Resistor 33—69.9 kilohms
Resistor 35—61.2 kilohms
Resistor 37—750 kilohms
Capicitor 31—0.15 microfarads
Capacitor 34—0.47 microfarads Referring to the timing diagram shown in FIGS. 3a through 3g, the output of clock 14 provides a series of clock pulses shown in FIG. 3a which are applied to the counter 16 which provides an output waveform shown in FIG. 3b. In the preferred embodiment the counter 16 includes two decade counters and a binary counter (not shown) for counting up to 64 in binary notation. Thus, when the two decade counters and the binary counter are coupled in series, the counter 16 effectively divides the frequency of the input pulses by 6,400.

The output waveform shown in FIGS. 3b is applied to the input terminal of the integrator 11 and is applied to the passive integrator network formed of resistor 30 and capacitor 31. The RC time constant provided by the resistor 30 and the capacitor 31 network produces exponential waveform shown in FIG. 3c. At the same time the waveform B is applied to the summing terminal 36 through the resistor 35. The effect of the resistor 30 capacitor 31 is to provide a delay in the application of steady state current to the summing terminal 36.

The resistors 33, 35 capacitor 34 feedback network coupled to the operational amplifier 32 provides a second exponential waveform and the composite effect of both exponential waveforms produces an output waveform shown in FIG. 3d as waveform 40. The negative going portion of curve 40 closely approximates a pressure v. altitude curve with pressure represented on the vertical axis and altitude on the horizontal axis.

The pressure transducer 10 is responsive to the pressure of the altitude of the vehicle and produces a voltage which is proportional to the pressure in the immediate environment of the aircraft vehicle. This voltage has a DC level and is shown in FIG. 3d as voltage level 41. The output signal 41 from the pressure transducer is compared with the waveform 40 of the integrator by comparator 17 to provide a transition of the output state of comparator 17 as shown at point 42 in FIG. 3f. The waveform shown in FIG. 3f is synchronized by the synchronizer 18 with the operation of the clock 14.

The counter 16 also provides pulses to the code converter 21 to provide a digitally encoded information shown in FIG. 3g as waveform 43 in a suitable code such as ARINC code which is a linearly increasing code comprised of a substantially large number of small discrete digital increments.

The positive transition of the output of comparator 17 shown in FIG. 3f at time 42 causes the flip-flops in the storage 19 to temporarily store the encoded output from code converter 21 as shown at time 42 in FIG. 3g. The flip-flops thereby temporarily store a codeword which may be transmitted to the output amplifier 22 which buffers the digitally encoded information of the altitude of the aircraft vehicle and interfaces it to any suitable external equipment. The output code is shown as waveform 44 in FIG. 3g.

As shown in FIG. 3d, the only portion of the waveform 40 which represents the curve of altitude v. barometric pressure that is used for comparison with the output signal 41 from the transducer is the negative going half cycle of waveform 40. The symmetry of the waveform 40 is caused by the symmetry of the rectangular wave shown in FIG. 3b and therefore the closed loop requires only one comparator 12 for comparing the reference voltage applied from reference voltage power supply 23 with the output waveform from the integrator 11. The reference voltage level is shown in FIG. 3d as voltage level 45. If the amplitude of the waveform 40 from the integrator 11 exceeds the reference voltage 45, the operation of the closed loop increases the frequency of the clock pulses shown in FIG. 3a to thereby reduce the peak amplitude of the waveform 40 from the integrator 11 until it reaches the reference voltage level 45. Correspondingly, if the peak amplitude of the waveform 40 of the integrator 11 is too low, the closed loop decreases the frequency of the clock pulses shown in FIG. 3a to thereby increase the amplitude of the waveform 40 from the integrator 11 to the reference voltage level 45. Thus, the effect of the closed loop construction of the present invention is to maintain the amplitude of the waveform 40 within precise limits determined by the reference voltage level 45.

The application of the reference voltage 45 shown in FIG. 3d to comparator 12 and pressure transducer 10 provides added accuracy to the present invention. In the event that the reference voltage 45 varies due to change in temperature of the components, long-term drift of the regulator circuit or changes in the input supply voltage, the change in the reference voltage 45 applied to the comparator 12 is identical to the change in the reference voltage applied to the pressure transducer 10. Thus any change in the output of the reference voltage power supply 23 does not affect the comparison of the output signal 41 from the transducer 10 with the waveform 40 from the integrator 11. Thus the accuracy of the system is maintained in spite of any undesirable changes in the level of the reference voltage 45.

Obviously, many modifications and variations of the present invention are possible in light of the above teachings. It is therefore to be understood that within the scope of the appended claims, the invention can be practiced otherwise than as specifically described.

I claim:

1. An altitude measuring device comprising
pressure transducer means for providing an output signal which is a function of the barometric pressure at the altitude sought to be measured;
integrator means for providing a waveform which represents a curve of altitude as a function of barometric pressure, and
comparator means having one input coupled to the output of said pressure transducer means and a second input coupled to said integrator means, said comparator means being operative to provide a transition of its input when the output signal provided by said pressure transducer means intersects the waveform provided by said integrator means, whereby the point of time of the transition of the output is a function of the altitude sought to be measured.

2. The device as described in claim 1 and further including storage means coupled to the output of said comparator means for providing a digitally encoded information of the altitude sought to be measured.

3. Encoding means for providing a digitally encoded information of a measured function which varies approximately exponentially comprising
transducer means for providing an output signal which varies linearly with respect to said measured function;
integrator means for providing an exponential waveform which varies approximately in accordance with the variation of said function, and
means coupled to the outputs of said transducer means and said integrator means for combining said output signal from said transducer means and said exponential waveform from said integrator means for providing a digitally encoded information at the point of intersection of said output signal with said exponential waveform to provide a digitally encoded measurement of said function.

4. An altitude measuring device comprising
pressure transducer means for providing an output signal which is a function of the barometric pressure at the altitude sought to be measured;
integrator means for providing a waveform which represents a curve of altitude as a function of barometric pressure; and
means coupled to the outputs of said pressure transducer means and said integrator means for combining said output signal from said pressure transducer means and said integrator means.

5. An integrator responsive to an input waveform at an input terminal for providing an output waveform at an output terminal which output waveform represents a curve of altitude as a function of barometric pressure for use in measuring altitude comprising
a passive integrator network having a first resistor-capacitor circuit for providing a first exponential waveform, and
an active integrator network having a feedback network which includes a second resistor-capacitor network for providing a second exponential waveform whereby the combination of said first exponential waveform with said second exponential waveform closely approximates a curve of altitude as a function of barometric pressure.

6. The devices described in claim 5 and wherein said active integrator network further includes an operational amplifier having a summing terminal and said passive integrator network and said feedback network are coupled to said summing terminal.

7. The device as described in claim 6 and wherein said first resistor-capacitor network has an input coupled to said input terminal of said integrator and an output terminal and further including:
a first resistor coupled between said output of said first resistor-capacitor network and said summing terminal of said operational amplifier, and
a second resistor coupled between said input terminal of said integrator and said summing terminal of said operational amplifier.

8. The device as described in claim 5 and wherein said second resistor-capacitor network in said feedback network includes a resistor and a capacitor coupled in parallel.

9. An altitude measuring device comprising
pressure transducer means for providing an output signal which is a function of the barometric pressure at the altitude sought to be measured,
integrator means for providing a waveform which represents a curve of altitude as a function of barometric pressure,
comparator means having one input coupled to the output of said pressure transducer means and a second input coupled to said integrator means, said comparator means being operative to provide a transition of its input when the output signal provided by said pressure transducer means intersect the waveform provided by said integrator means, whereby the point of time of the transition of the output is a function of the altitude sought to be measured,
counter means for providing a series of regularly recurring pulses,
code converter means coupled to the output of said counter means for providing an encoded count of the number of pulses produced by said counter means, and
storage means having one input coupled to the output of said comparator means and a second input coupled to the output of said code converter means, said storage means being operative to temporarily store a digitally encoded representation of the altitude sought to be measured by temporarily storing the encoded output of said code converter at the point of time when said comparator provides a change of state of its output.

10. The device as described in claim 9 further including:
clock means coupled to said counter for providing pulses, and synchronizer means coupled between sad comparator means and said storage means and having an input coupled to the output of said clock means, said synchronizer means including delay means for synchronizing the operation of said comparator with the operation of said counter means, said code converter means and said storage means.

11. Encoding means for providing a digitally encoded information of a measured function which varies approximately exponentially comprising transducer means for providing an output signal which varies linearly with respect to said measured function, integrator means for providing an exponential waveform which varies approximately in accordance with the variation of said function, means coupled to the outputs of said transducer means and said integrator means for combining said output signal from said transducer means and said exponential waveform from said integrator means for providing a digitally encoded information at the point of intersection of said output signal with said exponential waveform to provide a digitally encoded measurement of said function said means coupled to the output of said transducer means and said integrator means includes storage means having a plurality of flip-flops for providing said digitally encoded information at the point of intersection of said output signal with said exponential waveform.

12. Encoding means for providing a digitally encoded information of a measured function which varies approximately exponentially comprising transducer means for providing an output signal which varies linearly with respect to said measured function, integrator means for providing an exponential waveform which varies approximately in accordance with the variation of said function, means coupled to the outputs of said transducer means and said integrator means for combining said output signal from said transducer means and said exponential waveform from said integrator means for providing a digitally encoded information at the point of intersection of said output signal with said exponential waveform to provide a digitally encoded measurement of said function, counter means for providing a series of regularly recurring pulses, code converter means coupled to the output of said counter means for providing an encoded count of the number of pulses produced by said clock means, and storage means coupled to the output of said code converter means having a plurality of flip-flops for providing said digitally encoded information at the point of intersection of said output signal with said exponential waveform.

13. An altitude measuring device comprising pressure transducer means for providing an output signal which is a function of the barometric pressure at the altitude sought to be measured, integrator means for providing a waveform which represents a curve of altitude as a function of barometric pressure, means coupled to the outputs of said pressure transducer means and said integrator means for combining said output signal from said pressure transducer means and said integrator means, a passive integrator network, and an active integrator network coupled to the output of said passive integrator network.

14. A device as described in claim 13 wherein said first passive integrator network includes a resistor-capacitor network.

15. The device as described in claim 13 wherein said second active integrator network includes an operational amplifier having a feedback circuit, said feedback circuit including a resistor-capacitor network.

* * * * *